(12) United States Patent
Hirata et al.

(10) Patent No.: US 9,347,396 B2
(45) Date of Patent: May 24, 2016

(54) PISTON STRUCTURE FOR ENGINE

(71) Applicant: Mazda Motor Corporation, Aki-gun, Hiroshima (JP)

(72) Inventors: Koichi Hirata, Hiroshima (JP); Yasunori Kanda, Hiroshima (JP); Kouji Kubo, Hiroshima (JP); Mitsutaka Yamaya, Aki-gun (JP); Shuji Takuma, Hiroshima (JP); Tatsuya Kobayashi, Hiroshima (JP); Takeshi Motomuro, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 106 days.

(21) Appl. No.: 14/473,968

(22) Filed: Aug. 29, 2014

(65) Prior Publication Data

US 2015/0075479 A1    Mar. 19, 2015

(30) Foreign Application Priority Data

Sep. 18, 2013   (JP) .................................. 2013-192758
Feb. 6, 2014   (JP) .................................. 2014-021317
Feb. 20, 2014   (JP) .................................. 2014-020966

(51) Int. Cl.
    *F16J 1/14*      (2006.01)
    *F02F 3/00*      (2006.01)
    *F16J 1/16*      (2006.01)

(52) U.S. Cl.
    CPC ............. *F02F 3/0069* (2013.01); *F02F 3/0084* (2013.01); *F16J 1/16* (2013.01)

(58) Field of Classification Search
    CPC .......... F02F 3/0069; F02F 3/0084; F16J 1/16; F16J 1/18; F16J 1/14

USPC .......................................... 123/193.6; 92/187
See application file for complete search history.

(56) References Cited

U.S. PATENT DOCUMENTS 3,058,792 A * 10/1962 Elford et al. .................... 92/127
4,964,332 A * 10/1990 Sawyer ........................... 92/187
(Continued)

FOREIGN PATENT DOCUMENTS

JP     59181248 U    12/1984
JP     60154663 U    10/1985
(Continued)

OTHER PUBLICATIONS

Japanese Patent Office, International Search Report of PCT/JP2013/004814, Sep. 10, 2013, 4 pages.
(Continued)

*Primary Examiner* — Marguerite McMahon
(74) *Attorney, Agent, or Firm* — Alleman Hall McCoy Russell & Tuttle LLP

(57) ABSTRACT

A piston pin structure for an engine is provided, which suppresses integral resonance of a piston, a piston pin, and a smaller end part of a connecting rod with respect to a larger end part of the connecting rod on the combustion stroke, as well as suppresses an increase of noise on other strokes, and restricts the fixed dynamic absorber inside the piston pin from coming off and ensures a coming-off function.

The piston pin structure may include a dynamic absorber including a fixed part fixed to a piston pin, a movable part extending in the axial direction of the piston pin, and a supporting part for swingably supporting the movable part with respect to the fixed part. A restriction mechanism for mechanically restricting the movement of the dynamic absorber in the axial direction may also be included.

5 Claims, 15 Drawing Sheets

(56) References Cited

U.S. PATENT DOCUMENTS

| | | | |
|---|---|---|---|
| 5,327,813 A | * | 7/1994 | DeBell et al. .................... 92/187 |
| 5,709,184 A | * | 1/1998 | Ali .............................. 123/193.6 |
| 6,923,153 B2 | * | 8/2005 | Rein et al. ................... 123/193.6 |

FOREIGN PATENT DOCUMENTS

| | | |
|---|---|---|
| JP | 62163365 U | 10/1987 |
| JP | 07054996 A | 2/1995 |
| JP | 2004353500 A | 12/2004 |
| WO | 2014034034 A1 | 3/2014 |

OTHER PUBLICATIONS

Masaya Otsuka, "How to Minimize Diesel Combustion Noise by Improving Engine Structure," Proceedings of Society of Automotive Engineers Convention, No. 36-05, Society of Automotive Engineers of Japan, Inc., May 2005, p. 7-10.

* cited by examiner

PISTON STRUCTURE FOR ENGINE

FIELD OF THE INVENTION

This invention relates to a piston structure for an engine, which comprises a piston reciprocating within a cylinder, a connecting rod with a smaller end part that is coupled to the piston and a larger end part that is coupled to a crankshaft, a cross-sectionally hollow piston pin coupling the piston to the smaller end part of the connecting rod, and a dynamic absorber provided inside the piston pin.

BACKGROUND ART

Generally, in engines installed in vehicles such as automobiles, a piston is coupled to a smaller end part of a connecting rod by a piston pin. Specifically, the piston pin is inserted through a pin insertion hole formed in the smaller end part of the connecting rod, and the smaller end part of the connecting rod is located in a central area of the piston pin along the central axis direction. Two boss parts are formed in a bottom face of the piston (the face opposite to a top face, which is the face on the opposite of the combustion chamber side), at positions corresponding to both end portions of the piston pin along the central axis direction so as to sandwich the smaller end part of the connecting rod therebetween. The two boss parts are formed with pin supporting holes into which both the end portions of the piston pin along the central axis direction are inserted and for supporting both the end portions, respectively (e.g., see JP2004-353500A).

Such engines having the above configuration are known to cause combustion noise due to resonance caused by a basic structure of the engine (e.g., see Masaya Otsuka, "How to Minimize Diesel Combustion Noise by Improving Engine Structure," Proceedings of Society of Automotive Engineers Convention, No. 36-05, Society of Automotive Engineers of Japan, Inc. May 2005, P. 7-10). In "How to Minimize Diesel Combustion Noise by Improving Engine Structure," it is described that the engine sound has three peaks at 1.7 kHz, 3.3 kHz, and 6 kHz. One of these peaks (3.3 kHz) is caused by stretching resonance of the connecting rod, and the amplitude of this resonance is difficult to reduce.

RELATED ART

Patent Document

[Patent document 1] Japanese Unexamined Patent Application Publication No. 2004-353500

Non-Patent Document

[Non-patent document 1] Masaya Otsuka, "How to Minimize Diesel Combustion Noise by Improving Engine Structure," Proceedings of the Society of Automotive Engineers of Japan No. 36-05, the Society of Automotive Engineers of Japan, May in 2005, p 7-10

SUMMARY OF THE INVENTION

Problems to be Solved by the Invention

The present inventors have studied spring mass models for pistons and connecting rods, and as a result, they have found out the following.

In spring mass models for pistons and connecting rods, a piston, a piston pin, and a smaller end part of a connecting rod correspond to a point mass (wherein the mass is M (unit: kg)) as a whole, and a coupling part of the connecting rod coupling the smaller end part and a larger end part thereof corresponds to a spring (wherein the spring constant is K (unit: N/m)) supporting the point mass at the larger end part. Thus, if the piston, the piston pin, and the smaller end part of the connecting rod act integrally, these components integrally resonate with respect to the larger end part of the connecting rod at a resonance frequency of $(1/2\ \pi) \times (K/M)^{1/2}$ Hz (e.g., 3 kHz-4 kHz). This resonance corresponds to the stretching resonance of the connecting rod described above the Patent Document 1.

Meanwhile, a lubricant film is formed between the piston pin and the pin insertion hole of the connecting rod. The lubricant film corresponds to the spring coupling the piston pin to the smaller end part of the connecting rod. Moreover, in a case where a full floating type assembly, in which the piston pin is turnable with respect to all the boss parts and the smaller end part of the connecting rod, is adopted, in addition to between the piston pin and the pin insertion hole of the connecting rod, lubricant films are also formed between the piston pin and the pin supporting holes of the boss parts of the piston. This lubricant film corresponds to springs coupling the piston pin to the piston.

With the lubricant film between the piston pin and the pin insertion hole of the connecting rod (in the full floating type, this lubricant film and the lubricant films between the piston pin and the pin supporting holes of the boss parts of the piston), the piston is supported by the smaller end part of the connecting rod via the spring, and the piston, the piston pin, and the smaller end part of the connecting rod do not integrally resonate with respect to the smaller end part of the connecting rod. Since the piston is not pushed with a strong force except for on the combustion stroke (expansion stroke), the lubricant film remains, and thereby, the resonance does not occur.

On the other hand, on the combustion stroke, since the piston is pushed with a strong force, the lubricant film is eliminated, and as a result, the piston, the piston pin, and the smaller end part of the connecting rod integrally resonate with respect to the larger end part of the connecting rod.

From this point of view, since the piston, the piston pin, and the smaller end part of the connecting rod become integral on the combustion stroke, it can be considered to utilize a dynamic absorber in order to suppress the resonance (reduce vibration at the resonance frequency). However, by simply providing the dynamic absorber, although the noise due to the resonance can be reduced on the combustion stroke, the noise increases due to the vibration of the dynamic absorber on other strokes where the piston, the piston pin, and the smaller end part of the connecting rod do not become integral. Moreover, in case of the dynamic absorber provided inside of the piston pin, it is necessary to fix, i.e. secure, the dynamic absorber so as not to be come off.

Therefore, the present invention aims to provide a piston pin structure for an engine that suppresses integral resonance of a piston, a piston pin and a smaller end part of a connecting rod with respect to a larger end part of the connecting rod on combustion stroke, as well as that can suppress an increase in noise on other strokes and restrict the fixed dynamic absorber inside the piston pin from coming off and ensure a coming-off function.

BRIEF SUMMARY OF THE INVENTION

According to the present invention, a piston structure for an engine includes a piston for reciprocating within a cylinder, a connecting rod having a smaller end part coupled to the piston and a larger end part coupled to a crankshaft, a cross-sectionally hollow piston pin coupling the piston to the smaller end part of the connecting rod, and a dynamic absorber provided inside the piston pin, wherein the dynamic absorber includes a fixed part fixed to the piston pin, a movable part extending to the axial direction of the piston pin, and a supporting part for swingably supporting the movable part with respect to the fixed part, as well as a restriction mechanism mechanically restricting the movement of the dynamic absorber in the axial direction.

According to the above configuration, in a case where the lubricant film between the piston pin and the connecting rod (in a full-floating type, the lubricant film and a lubricant film between the piston pin and the piston) is eliminated on the combustion stroke, and the piston, the piston pin, and the smaller end part of the connecting rod become integral, the dynamic absorber can suppress the integral resonance thereof. Moreover, since the dynamic absorber is provided inside the piston pin, in a case where the lubricant film exists between the piston pin and the connecting rod, in other words, on the intake stroke, the compression stroke, and the exhaust stroke, the lubricant film (spring) prevents vibration of the dynamic absorber from being transmitted to the connecting rod, and thus, noise does not increase due to the vibration. Moreover, by providing the dynamic absorber inside the piston pin, the space can effectively be utilized and a size increase of the piston is not required.

Additionally, since the restriction mechanism for mechanically restricting the movement of the dynamic absorber in the axial direction is provided, it restricts the fixed dynamic absorber inside the piston pin from coming off while also ensuring that the dynamic absorber is able to be removed.

In an embodiment of the present invention, the restriction mechanism is configured by a C-type clip provided on the fixed part.

According to the above structure, coming-off prevention, i.e. securement, of the dynamic absorber can be achieved by a simple configuration.

In an embodiment of the present invention, the restriction mechanism is configured by a stopper provided on an inner circumferential part of the piston pin on a corresponding position of the fixed part and a C-type clip.

According to the above configuration, coming-off prevention of the dynamic absorber can be achieved by a simple configuration of the stopper and the C-type clip.

In an embodiment of the present invention, two dynamic absorbers are provided. Accordingly, the dynamic absorber of the above configuration may be a first dynamic absorber, and the piston structure for an engine may further comprise a second dynamic absorber provided inside the piston pin, wherein the second dynamic absorber includes a portion of the fixed part fixed to the piston pin, a second movable part extending in an opposite axial direction formed along the axis of the piston pin opposite the axial direction, and a second supporting part for swingably supporting the second movable part with respect to the fixed part, as well as a second restriction mechanism mechanically restricting the movement of the second dynamic absorber in the opposite axial direction. According to this configuration, at least one of the first and second dynamic absorbers includes a shaft part provided on the corresponding supporting part of the at least one of the first and second dynamic absorbers, and extending from the corresponding supporting part along the axis of the piston pin, and a cap part that is fixed on the outer circumference of the shaft part. The second movable part is formed by the shaft part and the cap part. Further the second restriction mechanism includes a small diameter part of the piston pin for fixing the fixed part and a large diameter part of the second movable part.

According to the above configuration, it is possible to enlarge the diameter of the movable part, and further achieve coming-off prevention of the dynamic absorber by both of the small diameter part of the piston pin and the large diameter part of the dynamic absorber. Moreover, the mass may be easily adjusted by the cap part.

In another embodiment of the present invention, two dynamic absorbers are provided and shafts and caps may be provided on each. According to this aspect, the dynamic absorber of the above discussed configuration is a first dynamic absorber, and the piston structure for an engine further comprises a second dynamic absorber provided inside the piston pin, wherein the second dynamic absorber includes a portion of the fixed part fixed to the piston pin, a second movable part extending in an opposite axial direction formed along the axis of the piston pin opposite the axial direction, and a second supporting part for swingably supporting the second movable part with respect to the fixed part, as well as a second restriction mechanism mechanically restricting the movement of the second dynamic absorber in the opposite axial direction. The movable part of each of the first and second dynamic absorbers respectively includes a shaft part extending from the supporting part along the axis of the piston pin, and a cap part that is fixed on the outer circumference of the shaft part. Each of the first and second restriction mechanisms includes a respective small diameter part of the piston pin for fixing the fixed part and a respective large diameter part of the corresponding movable part.

According to the above configuration, while the two dynamic absorbers can be configured similarly or identically, the flexibility of frequency difference can be increased by mass adjustment of the cap part.

Effects of the Invention

According to the present invention, on the combustion stroke, while it suppresses integral resonance of a piston, a piston pin, and a smaller end part of a connecting rod with respect to a larger end part of the connecting rod, it suppresses an increase of noise on other strokes, and also it can restrict the fixed dynamic absorber inside the piston pin from coming off and ensure a coming-off function.

DETAILED DESCRIPTION OF THE EMBODIMENTS

The objects of suppressing integral resonance of a piston, a piston pin, and a smaller end part of a connecting rod with respect to a larger end part of the connecting rod on the combustion stroke, suppressing an increase of noise on other strokes, also restricting the fixed dynamic absorber inside the piston pin from coming off, and ensuring a coming-off function are realized by a configuration having a dynamic absorber that includes a restriction mechanism mechanically restricting the movement of the dynamic absorber in the axial direction as well as a fixed part fixed to the piston pin, a movable part extending to the axial direction of the piston pin, and a supporting part for swingably supporting the movable part with respect to the fixed part, on the piston structure for an engine that includes a piston for reciprocating within a cylinder, a connecting rod having a smaller end part coupled to the piston and a larger end part coupled to a crankshaft, a cross-sectionally hollow piston pin coupling the piston to the smaller end part of the connecting rod, and a dynamic absorber provided inside the piston pin.

First Embodiment

Figure 1:
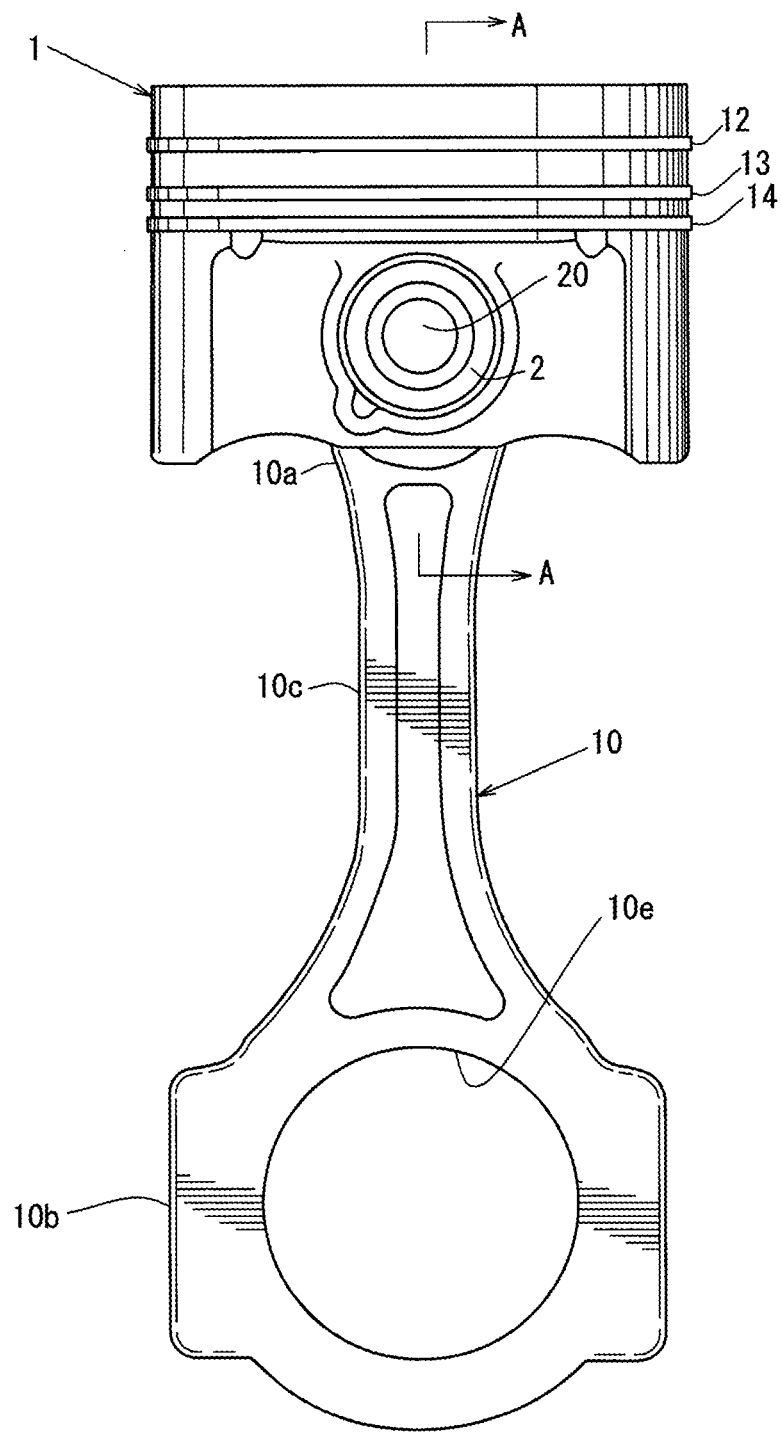
FIG. 1 is a view illustrating a piston and a connecting rod for an engine to which a piston structure of the present invention is adopted.

Hereinafter, one embodiment of the present invention is described in detail with reference to the appended drawings. A figure shows a piston structure for a diesel engine. FIG. 1 shows a piston and a connecting rod for the engine, FIG. 2 shows a sectional view taken in the direction of the arrows along a line A-A, and FIG. 3 is a partial enlarged sectional view of FIG. 2.

Figure 2:
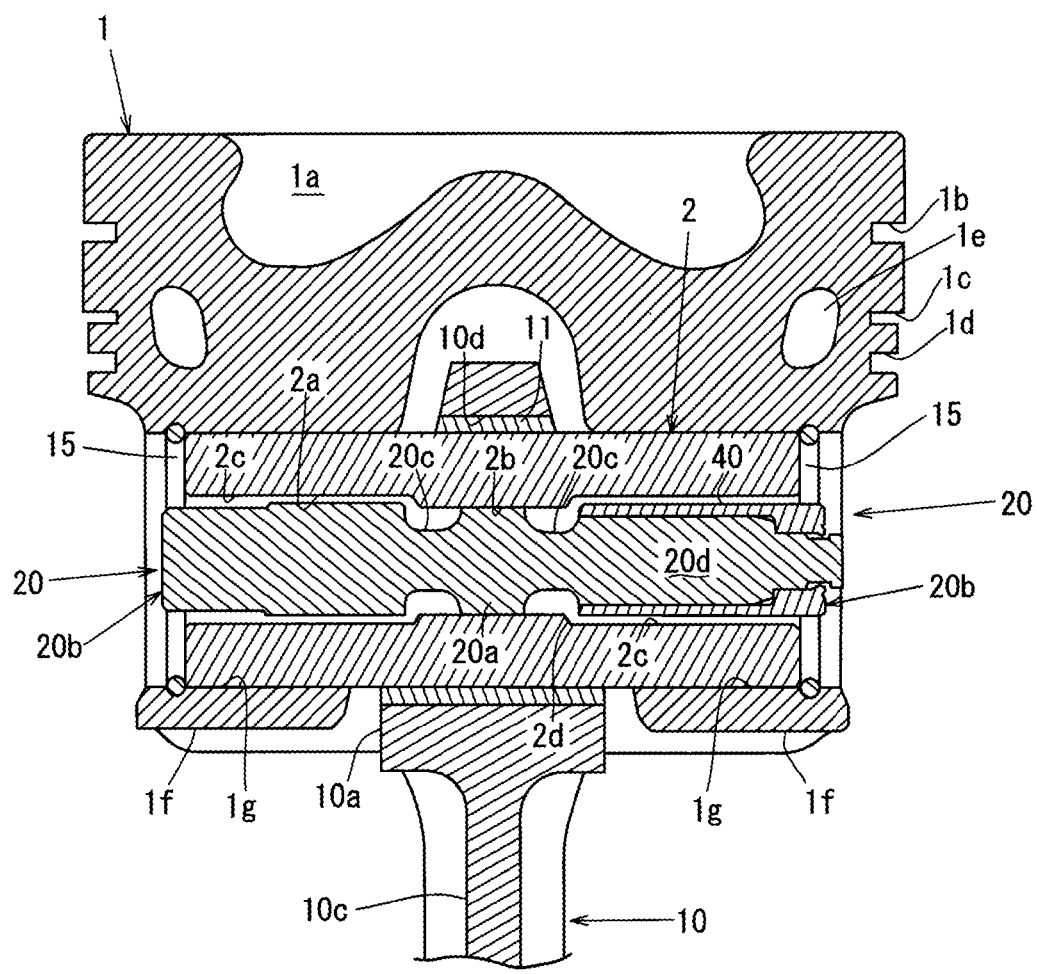
FIG. 2 is a sectional view taken in the direction of the arrows along a line A-A of FIG. 1.
Figure 3:
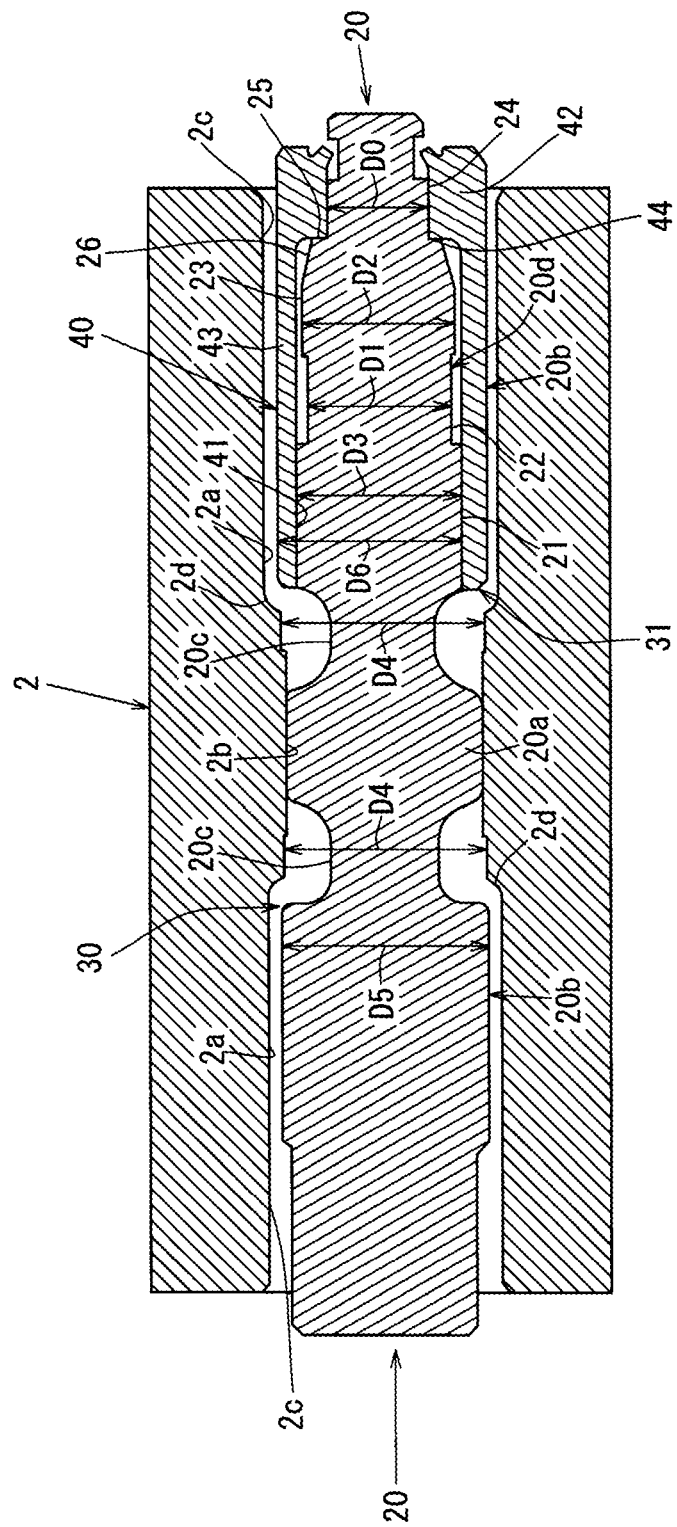
FIG. 3 is a partial enlarged sectional view of FIG. 2.

In FIG. 1 and FIG. 2, it is configured so that a piston 1 reciprocates in a cylinder in axial directions of the cylinder (up-and-down directions in FIG. 1 and FIG. 2) by repeating a cylinder cycle (intake stroke, compression stroke, combustion stroke (expansion stroke), and exhaust stroke).

The piston 1 is coupled to a smaller end part 10a (also referred to as a "small end") that is one end part of the connecting rod 10, via a piston pin 2. A larger end part 10b (also referred to as a "large end") that is the other end part of the connecting rod 10 is coupled to a crankshaft (not illustrated). The smaller and larger end parts 10a and 10b of the connecting rod 10 are coupled to each other by a coupling part 10c. The reciprocation of the piston 1 is transmitted to the crankshaft via the connecting rod 10 to rotate the crankshaft. The central axis direction of the piston pin 2 (left-and-right directions in FIG. 2) match with axial direction of the crankshaft.

On the smaller end part 10a of the connecting rod 10, a pin insertion hole 10d through which the piston pin 2 is inserted is formed, and on the larger end part 10b of the connecting rod 10, a shaft insertion hole 10e through which the crankshaft is inserted is formed. Note that although it is omitted in FIG. 1, the larger end part 10b of the connecting rod 10 is divided into two pieces at a central position of the shaft insertion hole 10e in a longitudinal direction of the coupling part 10c.

The piston pin 2 is inserted through the pin insertion hole 10d of the smaller end part 10a of the connecting rod 10, and the smaller end part 10a of the connecting rod 10 is located in a central area of the piston pin 2 along the central axis direction. Moreover, the smaller end part 10a of the connecting rod 10 is located in a central area of the piston 1 along the central axis direction of the piston pin 2.

The piston pin 2 is turnably inserted through the pin insertion hole 10d of the connecting rod 10. Note that a bushing 11 is fixed to an inner circumferential face of the pin insertion hole 10d of the connecting rod 10, and to be more precise, the piston pin 2 is inserted to be turnable with respect to the bushing 11.

A lubricant film is formed by supplying a lubricant circulating within the engine between the piston pin 2 and the pin insertion hole 10d (specifically, the bushing 11) of the connecting rod 10, and the lubricant film and the bushing 11 enable the piston pin 2 to smoothly turn within the pin insertion hole 10d of the connecting rod 10.

A cavity 1a is formed in a top face (a piston pin head) of the piston 1 as shown in FIG. 2, a top ring groove 1b, a second ring groove 1c, and an oil ring groove 1d are formed in the outer circumference part of the piston 1, and also a cooling channel 1e is formed inside the piston 1. Further, a top ring 12, a second ring 13, and an oil ring 14 are installed in each ring groove 1b, 1c, and 1d respectively as shown in FIG. 1.

Two boss parts 1f are formed in a rear face of the piston 1 (the face opposite to the top face, that is the face of opposite to the combustion chamber side) to bulge toward the crankshaft side, at positions corresponding to both end portions of the piston pin 2 along the central axis direction so that the two boss parts 1f sandwich the smaller end part 10a of the connecting rod 10 between both of the ends. In each of the two boss parts 1f, a respective pin supporting hole 1g is formed to extend along the central axis direction of the piston pin 2. Both the end portions of the piston pin 2 along the central axis direction are supported by being inserted into the pin supporting holes 1g of the two boss parts 1f, respectively.

In this embodiment, a full floating type assembly is adopted as an assembly method for the piston pin 2. Specifically, the piston pin 2 is turnable with respect to the pin insertion hole 10d of the connecting rod 10 and is also turnable with respect to the pin supporting hole 1g of the boss part 1f of the piston 1.

Similar to between the piston pin 2 and the pin insertion hole 10d of the connecting rod 10, lubricant films are also formed between the piston pin 2 and the pin supporting holes 1g of the boss parts 1g of the piston 1, and these lubricant films enable the piston pin 2 to smoothly turn within the pin supporting holes 1g of the boss parts 1f of the piston 1.

A snap ring 15 is inserted into each of the pin supporting holes 1g of the two boss parts 1f and fixed in each of end sections thereof on the outer circumferential face side of the piston 1, and the two snap rings 15 are located to contact with both outer end faces of the piston pin 2 along the central axis direction, so as to restrict a movement of the piston pin 2 along the central axis direction.

The piston pin 2 is hollow in its cross section, and a penetration hole 2a extending along the central axis direction of the piston pin 2 is formed in a central area of the piston pin 2 in its radial direction.

A press-fit portion 2b into which a fixed part 20a of a dynamic absorber 20 described later (that is the central part of the piston pin 2 in the longitudinal direction) is press-fitted is formed in the central area of the piston pin 2 along the central axis direction at an inner circumferential face of the penetration hole 2a. The inner diameter of the penetration hole 2a at the press-fit portion 2b is formed so as to be smaller than that of the penetration hole 2a at the other part.

Specifically, the penetration hole 2a has the press-fit portion 2b located in the central area of the piston pin 2 along the central axis direction and formed into a cylindrical shape with a small diameter, and accommodating portions 2c continuing from both sides of the press-fit portion 2b, located at both the end portions of the piston pin 2 along the central axis direction, and formed into a cylindrical shape with a large diameter.

A step face 2d facing the central axis direction of the piston pin 2 is formed by a step between the press-fit portion 2b and the accommodating portion 2c. The rigidity of the piston pin 2 can be improved by making the diameter of the press-fit portion 2b small.

Inside the piston pin 2 (within the penetration hole 2a), two dynamic absorbers 20 (so-called dynamic damper and hereinafter abbreviated just as damper) are provided to suppress the piston 1, the piston pin 2, and the smaller end part 10a of the connecting rod 10 from integrally resonating with respect to the larger end part 10b of the connecting rod 10 on the combustion stroke. These two dampers 20 as shown in FIG. 3 pass the center along the central axis direction of the piston pin 2 and are also respectively located on both sides sandwiching a perpendicular face with respect to the central axis direction of the piston pin 2.

Figure 4:
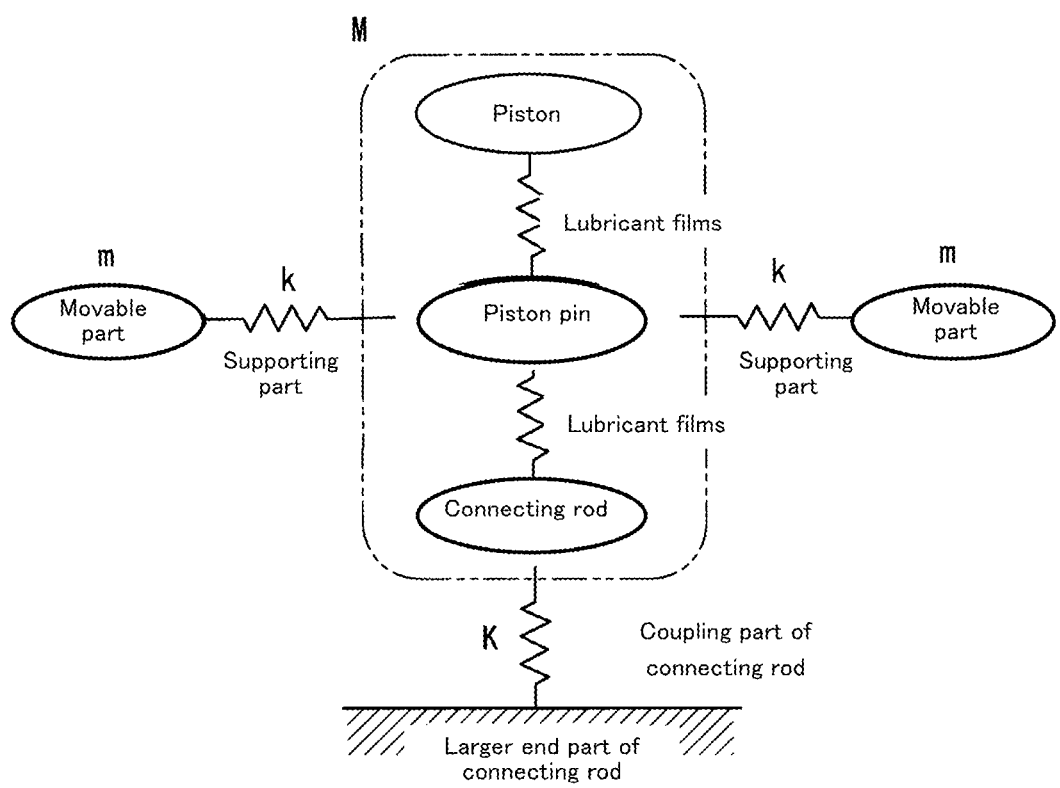
FIG. 4 is a view illustrating mass models of the piston and the connecting rod.

Here, a spring mass model for the piston 1 and the connecting rod 10 is as illustrated in FIG. 4. Specifically, the piston 1, the piston pin 2, and the smaller end part 10a of the connecting rod 10 correspond to a point mass (wherein the mass is M [unit: kg]) as a whole, and the coupling part 10c of the connecting rod 10 corresponds to a spring (wherein the spring constant is K [unit: N/m]) supporting the point mass at the larger end part 10b of the connecting rod 10.

The lubricant film between the piston pin 2 and the pin insertion hole 10d of the connecting rod 10 corresponds to a spring coupling the piston pin 2 to the smaller end part 10a of the connecting rod 10, and the lubricant films between the piston pin 2 and the pin supporting holes 1g of the boss parts 1f of the piston 1 correspond to springs coupling the piston pin 2 to the piston 1.

On the combustion stroke, since the piston 1 is pushed with a strong force, the lubricant film between the piston pin 2 and the pin insertion hole 10d of the connecting rod 10 (the spring coupling the piston pin 2 to the smaller end part 10a of the connecting rod 10) and the lubricant films between the piston pin 2 and the pin supporting holes 1g of the boss parts 1f of the piston 1 (the springs coupling the piston pin 2 to the piston 1) are all eliminated, and as a result, the piston 1, the piston pin 2, and the smaller end part 10a of the connecting rod 10 become integral. Thus, the piston 1, the piston pin 2, and the smaller end part 10a of the connecting rod 10 integrally resonate with respect to the larger end part 10b of the connecting rod 10 at a resonance frequency of $(1/2\pi) \times (K/M)^{1/2}$ Hz. In order to suppress the resonance (reduce the vibration at the resonance frequency), the two dampers 20 are provided inside the piston pin 2 (within the penetration hole 2a).

As illustrated in FIGS. 2 and 3, each damper 20 includes a fixed part 20a that is fixed, i.e., secured, to the press-fit portion 2b formed in the inner circumferential face of the penetration hole 2a of the piston pin 2, at least one and preferably a pair of movable parts 20b extending inside the piston pin 2 along the central axis direction of the piston pin 2, and at least one and preferably a pair of supporting parts 20c supporting the movable parts 20b to be vibratable with respect to the fixed part 20a in the radial directions of the piston pin 2.

In this embodiment, in view of reducing the number of members and the like, the two dampers 20 are formed integrally by each of movable parts 20b being integrally formed with fixed part 20a. Further, in one of the dampers 20 of the left side as shown in the figure, the fixed part 20a, the movable part 20b, and the supporting part 20c are integrally formed (integrated damper), and the other damper 20 of the right side as shown in the figure is an assembled-type damper formed by assembling a plurality of members (assembled damper), namely, the right-side movable part 20b and the cap 40, discussed below.

The integrated damper 20 and the assembled damper 20 are integrally coupled to each other at the respective fixed parts 20a. The integrated fixed parts 20a are press-fitted to be fixed to the press-fit portion 2b. Thus, the movable part 20b of the integrated damper 20 is accommodated inside one of the accommodating portions 2c, and the movable parts 20b of the assembled damper 20 are accommodated inside the other accommodating portion 2c.

The movable parts 20b are formed into a nearly circular cylinder and are designed such that the outer diameter thereof becomes smaller than the inner diameter of the accommodating portion 2c so as not to contact with the inner circumferential face of the accommodating portion 2c even when the movable part 20b vibrates. In this manner, each movable part 20b is arranged inside the accommodating portion 2c such that an outer circumferential face of the movable part 20b faces the inner circumferential face of the accommodating portion 2c with a slight gap therebetween. Moreover, each damper 20 has a restriction mechanism for mechanically restricting the movement in the axial direction.

Specifically, in the integrated damper 20 of the left side as shown in FIG. 3, the outer diameter D5 on the supporting part 20c side of the movable part 20b is formed to be larger relative to the inner diameter D4 of the minimum diameter part of the step face 2d of the piston pin 2, and herewith the restriction mechanism 30 is configured.

The assembled damper 20 of the right side as shown in FIG. 3 includes an integrally formed shaft part 20d, which extends from the supporting part 20c in the axis direction of the piston pin, a fixed cap part 40 as a mass adjusting member assembled on the outer circumference of this shaft part 20d, and a movable part 20b formed on the shaft part 20d and within the cap part 40. Additionally, the shaft part 20d includes an integrally formed first shaft part 21 with an outer diameter of D3, a second shaft part 22 with an outer diameter of D1, a third shaft part 23 with an outer diameter of D2, and a forth shaft part 24 with an outer diameter of D0, in this order from the supporting part 20c toward the outer end side, and a size of the outer diameters of each shaft part 21 to 24 is set so that a relational expression of D0<D1<D2<D3 is established.

Further, a step face 25 is formed on the end part of the supporting part 20c side of the fourth shaft part 24 and a taper part 26 is formed between the outer end in the radial direction of the step face 25 and the third shaft part 23 with a large inside diameter and a small outside diameter. The cap part 40 is formed integrally into a two-step cylindrical shape in which the press-fit portion 41 is located toward the tip side in the press-fit direction and the neck part 42 is loosely fitted to the outer circumference of the fourth shaft part 24, and forms a stopper 44 between a cylindrical part 43 having the same inner and outer diameters of the press-fit portion 41 and a neck part 42, and the press fitting is completed by contacting the stopper 44 with the step face 25 thereof when the cap part 40 is press-fitted.

Moreover, a clearance is formed between the inner diameter part of the cylindrical part 43 of the cap part 40 and the outer diameter part of the third shaft part 23 of the shaft part 20d. Thus, the outer diameter D6 (the outer diameter of the movable part 20b) of the cap part 40 is formed to be larger relative to the inner diameter D4 of the minimum diameter part of the step face 2*d* of the piston pin 2 (D6>D4), and herewith the restriction mechanism 31 is configured.

Meanwhile, each supporting part 20*c* is also formed into a nearly circular cylinder and is formed intermediate the movable parts 20*b* and the fixed part 20*a*. The outer diameter of the supporting parts 20*c* are smaller than the outer diameter of the movable part 20*b* and the inner diameter of the press-fit portion 2*b* so that it can be inserted into the press-fit portion 2*b*.

In this manner, the supporting parts 20*c* are disposed inside the press-fit portion 2*b* such that an outer circumferential face of the supporting part 20*c* faces an inner circumferential face of the press-fit portion 2*b* with a sufficient gap therebetween. Thus, the supporting parts 20*c* support the movable parts 20*b* to be vibratable with respect to the fixed part 20*a* in the radial directions of the piston pin 2.

The fixed part 20*a* is also formed into a circular cylinder. The outer diameter of the fixed part 20*a* is smaller than the outer diameter of the movable parts 20*b* but slightly larger than the inner diameter of the press-fit portion 2*b*, so that the fixed part 20*a* can be press-fitted into the press-fit portion 2*b*. The fixed part 20*a*, the movable part 20*b*, and the supporting part 20*c* are arranged in series with the central axes thereof matched with each other.

The integrated damper 20 and the assembled damper 20 are arranged such that the central axes thereof are matched with the axis of the piston pin 2. Moreover, the two dampers 20 and 20 have the movable parts 20*b* with substantially the same mass, and gravity points of the movable parts 20*b* of the two dampers 20 and 20 are located on the central axis of the piston pin 2 at positions symmetric to each other with respect to the face passing the center of the piston pin 2 along the central axis direction (i.e., the face passing the center and being perpendicular to the central axis of the piston pin 2).

Each of the supporting parts 20*c* of the dampers 20 correspond to a spring supporting the movable part 20*b* (here, the mass of the movable part 20*b* is m [unit: kg]), and when the spring constant is k (unit: N/m), in order to suppress the resonance, basically the value of k/m is made substantially the same as K/M. The length and the diameter of the movable part 20*b* and the length and the diameter of the supporting part 20*c* are set to obtain such a value of k/m. Technically, the mass of the supporting part 20*c* needs to be taken into consideration, but since the mass of the supporting part 20*c* is significantly less than that of the movable part 20*b*, the mass of the supporting part 20*c* can be ignored. Note that in a case where the vibration is allowed to increase at frequencies other than the resonance frequency, the value of k/m does not need to be substantially the same as that of K/M.

It is preferred that the spring constants of the two dampers 20 (supporting parts 20*c*) are made different from each other while having the masses of the movable parts 20*b* of the two dampers 20 substantially the same as each other. This is because not only the vibration at the resonance frequency but also the vibration in a comparatively wide frequency range including the resonance frequency can be reduced. To make the spring constants of the two dampers 20 different from each other, the lengths or the diameters of the supporting parts 20*c* of the two dampers 20 are made different from each other. Alternatively, both of the lengths or the diameters of the supporting parts 20*c* of the two dampers 20 may be made different from each other. Alternatively, the materials of the supporting parts 20*c* of the two dampers 20 may be made different. Note that the spring constants of the two dampers 20 may be made substantially the same.

In the case of making the spring constants of the two dampers 20 different from each other, for example, the spring constant of one of the dampers 20 is set such that the value of k/m becomes substantially the same as that of K/M, and the spring constant of the other damper 20 is set to be larger or smaller than the spring constant of the one of the dampers 20.

As described above, on the combustion stroke, the lubricant film between the piston pin 2 and the pin insertion hole 10*d* of the connecting rod 10 (the spring coupling the piston pin 2 to the smaller end part 10*a* of the connecting rod 10) and the lubricant films between the piston pin 2 and the pin supporting holes 1*g* of the boss parts 1*f* of the piston 1 (the springs coupling the piston pin 2 to the piston 1) are all eliminated, and as a result, the piston 1, the piston pin 2, and the smaller end part 10*d* of the connecting rod 10 resonate integrally with respect to the larger end part 10*b*. However, in this embodiment, the resonance is suppressed by the dampers 20 provided on the piston pin 2 and, thus, noise caused by the resonance can be reduced.

On the other hand, on the intake stroke, the compression stroke, and the exhaust stroke, the lubricant films respectively exist between the piston pin 2 and the pin insertion hole 10*d* of the connecting rod 10 and between the piston pin 2 and the pin insertion holes 1*g* of the boss parts 1*f* of the piston 1. As a result, such resonance that is caused on the combustion stroke does not occur. If the dampers are provided on the smaller end part of the connecting rod, the resonance on the combustion stroke can be suppressed; however, the dampers vibrate on the intake stroke, the compression stroke, and the exhaust stroke where the resonance does not occur. Therefore, on the intake stroke, the compression stroke, and the exhaust stroke, the noise becomes louder due to the vibration of the dampers. However, in this embodiment, since the dampers 20 are provided on the piston pin 2, on the intake stroke, the compression stroke, and the exhaust stroke, the lubricant film between the piston pin 2 and the pin insertion hole 10*d* of the connecting rod 10 (the spring coupling the piston pin 2 to the smaller end part 10*a* of the connecting rod 10) prevents the vibration of the dampers 20 from being transmitted to the connecting rod 10, and the noise does not become louder due to the vibration. Moreover, by providing the dampers 20 inside the piston pin 2, space can effectively be utilized and a size increase of the piston 1 is not required.

Furthermore, since the dampers 20 include the assembled damper 20 where the movable part 20*b* is formed by assembling the cap part 40 as a mass adjusting member to the fixed part 20*a*, mass adjusting of the movable part 20*b* is possible by exchanging the cap part 40 and it has an excellent convenience for example, in fixing manufacturing errors.

In this matter, the piston structure for an engine of a first embodiment illustrated in FIG. 1 to FIG. 4 includes a piston 1 reciprocating within a cylinder, a connecting rod 10 having a smaller end part 10*a* coupled to the piston 1 and a larger end part 10*b* coupled to a crankshaft, a cross-sectionally hollow piston pin 2 coupling the piston 1 to the smaller end part 10*a* of the connecting rod 10, and a damper 20 provided inside the piston pin 2, wherein the damper 20 includes a fixed part 20*a* fixed to the piston pin 2, at least one and preferably a pair of movable parts 20*b* extending in the axial directions of the piston pin 2, and at least one and preferably a pair of supporting parts 20*c* for swingably supporting the movable parts 20*b* with respect to the fixed part 20*a*, and also includes restriction mechanisms 30 and 31 for mechanically restricting the movement of the damper 20 in the axial direction (see FIG. 1 to FIG. 3).

According to this structure, in a case where the lubricant film between the piston pin 2 and the connecting rod 10 (in a full-floating type, the lubricant film and a lubricant film between the piston pin 2 and the piston 1) is eliminated on the combustion stroke, and the piston 1, the piston pin 2, and the smaller end part 10*a* of the connecting rod 10 become integral, the damper 20 can suppress the integral resonance thereof. Moreover, since the damper 20 is provided inside the piston pin 2, in a case where the lubricant film exists between the piston pin 2 and the connecting rod 10, in other words, on the intake stroke, the compression stroke, and the exhaust stroke, the lubricant film (spring) prevents vibration of the damper 20 from being transmitted to the connecting rod 10, and thus, noise does not increase due to the vibration. Moreover, by providing the damper 20 inside the piston pin 2, space can effectively be utilized and the size increase of the piston 1 is not required. In addition, since the restriction mechanisms 30 and 31 for mechanically restricting the movement of the damper 20 in the axial direction are provided, the restriction mechanisms 30 and 31 restrict the damper 20 inside the piston pin 2 from coming off and ensure a coming-off function (i.e., the ability to be removed) of the damper 20.

Moreover, in an embodiment of the present invention, two dampers 20 are provided, a shaft part 20*d* extending from a supporting part 20*c* to the axis direction of the piston pin 2 is provided on the supporting part 20*c* at least one of the dampers 20, a cap part 40 is fixed on the outer circumference of the shaft part 20*d*, the movable part 20*b* is formed by the shaft part 20*d* and the cap part 40, and further a restriction mechanism 31 is configured by the small diameter part of the piston pin 2 for fixing the fixed part 20*a* and the large diameter part (refer to the outer diameter part of the cylindrical part 43 of the cap part 40) of the movable part 40 (see FIG. 3).

According to this configuration, the diameter of the movable part 20*b* can be enlarged, as well as the coming-off prevention of the damper 20 can be achieved by both of the small diameter part of the piston pin 2 and the large diameter part of the movable part 40 (that is, the restriction mechanism 31). Moreover, the mass may be easily adjusted by the cap part 40.

Second Embodiment

Figure 5:
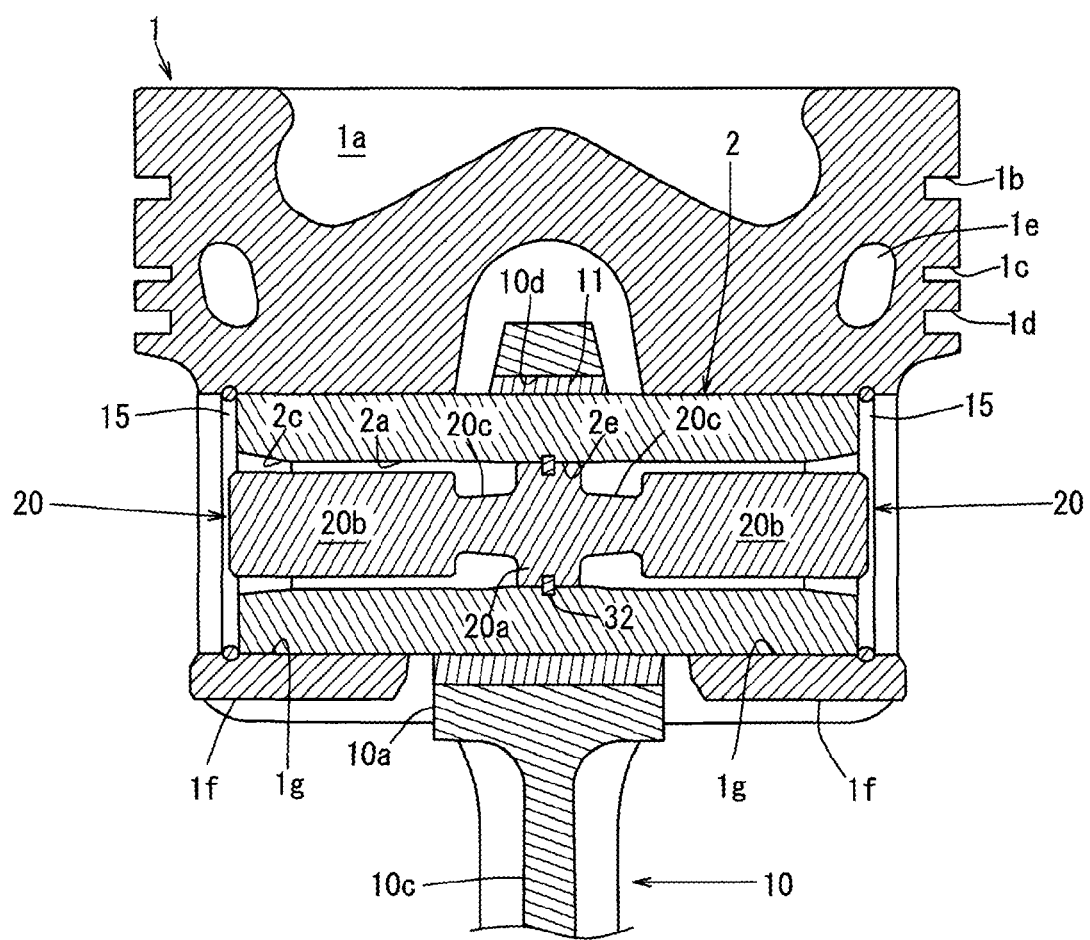
FIG. 5 is a sectional view illustrating another embodiment of the piston structure for an engine.
Figure 6:
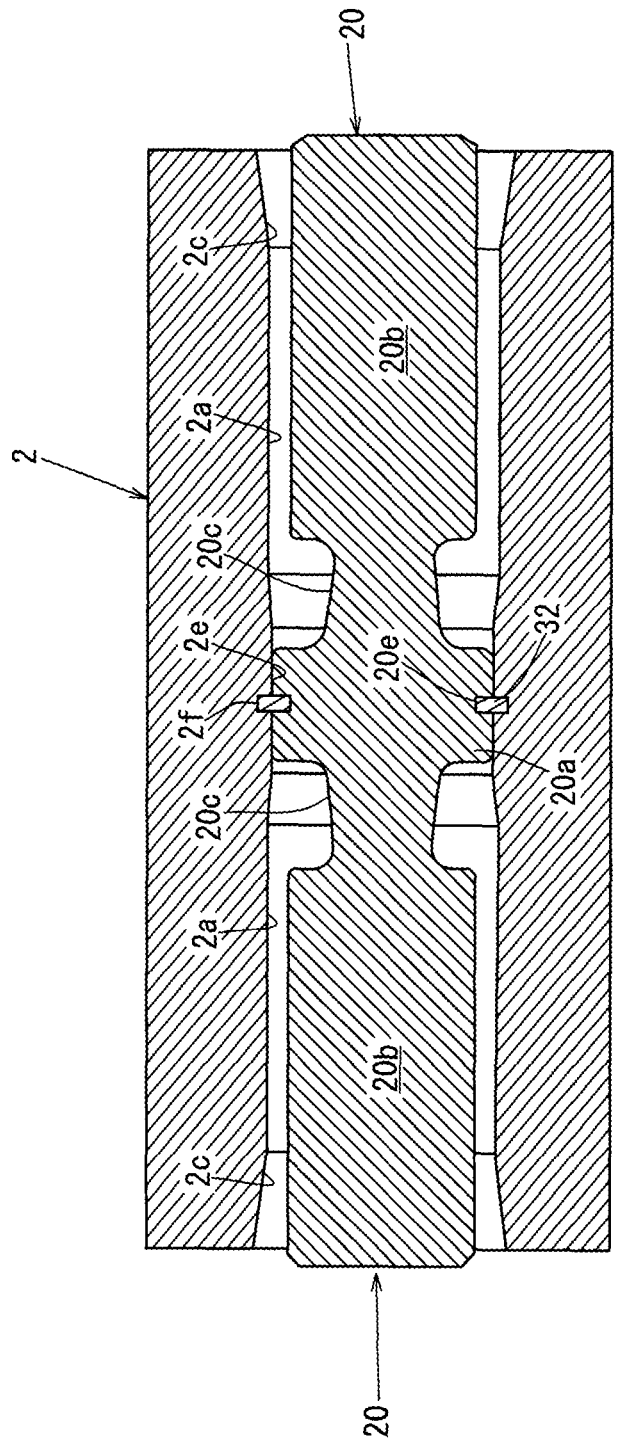
FIG. 6 is a partial enlarged sectional view of FIG. 5.

FIG. 5 is a sectional view illustrating another embodiment of a piston structure for an engine and FIG. 6 is a partial enlarged sectional view of FIG. 5. In this second embodiment shown in FIG. 5 and FIG. 6, an insertion part 2*e* is formed in place of the press-fit portion 2*b* of the first embodiment in the central area along the central axis direction of the piston pin 2. Moreover, the outside diameter of the movable parts 20*b* are formed to be smaller relative to the outside diameter of the fixed part 20*a*. Further, an annular groove part 20*e* is formed in the fixed part 20*a* (the central part along the central axis direction of the piston pin 2 of the fixed part 20*a*, of which it will be appreciated from a practical standpoint that one is provided) two dampers 20 formed integrally with each other in the same manner as in the first embodiment, and a C-type clip 32 that is set within the groove part 20*e*. On the other hand, the annular groove part 2*f* is formed in the part corresponding to the groove part 20*e* in the inner circumferential face of the insertion part 2*e* of the piston pin 2. Further, if the damper 20 on which the C-type clip 32 was put is inserted from one of the openings of the penetration hole 2*a*, the diameter is reduced in the state of touching with the part in which the groove part 2*f* of the inner circumferential face is not formed; however, it is enlarged at the opposed position to the groove part 2*f* and the C-type clip 32 fits into the groove part 2*f*. Thus, the fixed part 20*a* is fixed at the insertion part 2*e* of the piston pin 2 in a manner that prevents it from coming off.

In short, in the second embodiment shown in the FIG. 5 and FIG. 6, the restriction mechanism is configured by the C-type clip 32 provided on the fixed part 20*a*, and according to this structure, coming-off prevention of the damper 20 can be achieved by a simple configuration. Moreover, without press-fitting the fixed part 20*a* of the damper 20, since insertion and fixation can be achieved using the C-type clip 32, assembling workability of the damper 20 can be enhanced.

In the second embodiment shown in FIG. 5 and FIG. 6, since other structures, actions and effects are similar to the above embodiments, in FIG. 5 and FIG. 6, the same reference numbers are given to the same parts as in the foregoing Figures, and a detailed explanation thereof is omitted for the sake of brevity.

Third Embodiment

Figures 7A, 7B:
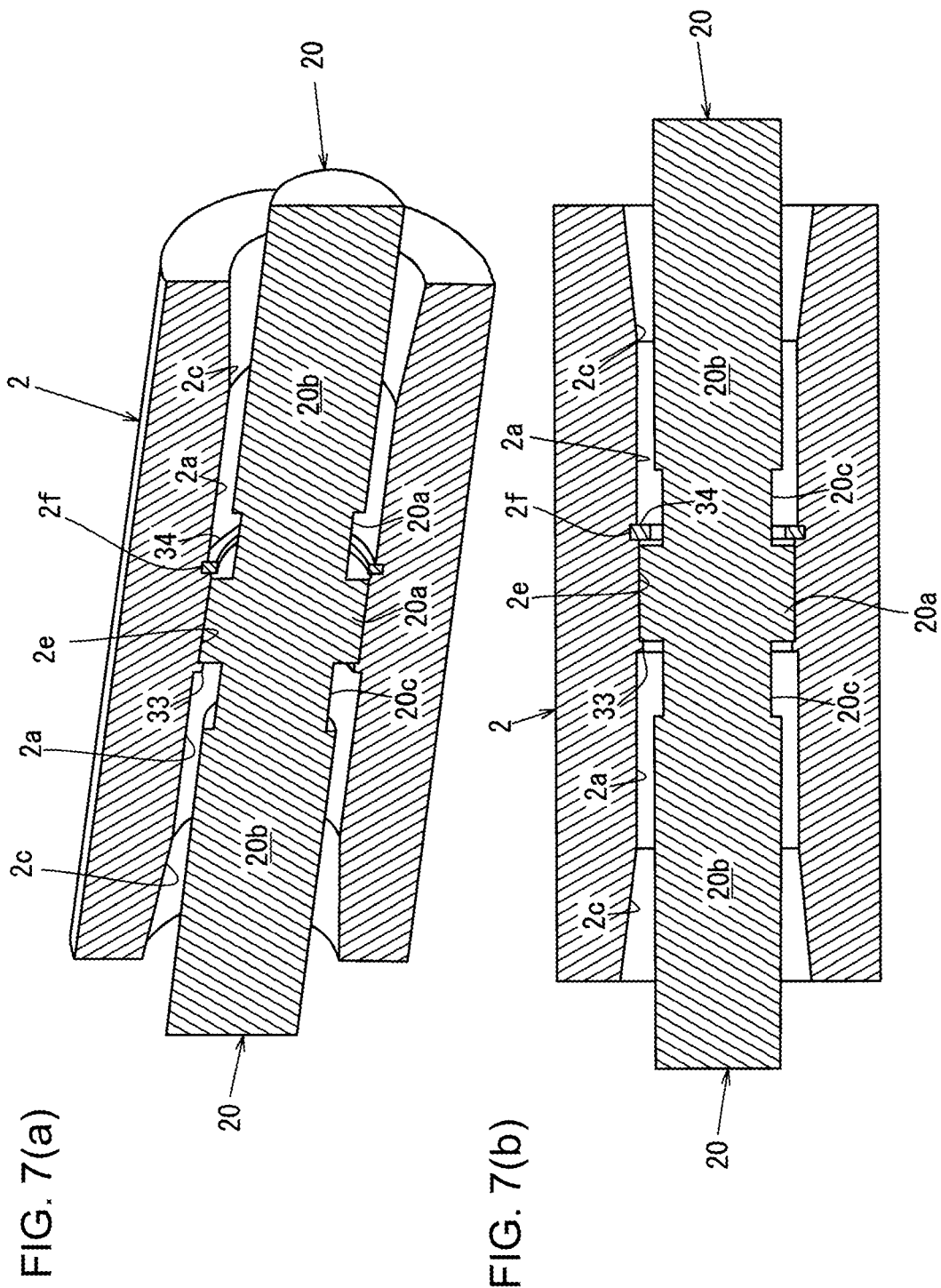
FIG. 7(a) is a perspective view in which a dynamic absorber assembled to the piston pin and FIG. 7(b) is a front view of the same.

FIGS. 7(*a*) and 7(*b*) shows another embodiment of a piston structure for an engine, FIG. 7(*a*) is a perspective view in which a damper assembled to the piston pin and (b) is the front view. In the third embodiment shown in FIG. 3, in the inner circumferential face of a through-hole 2*a* of the piston pin 2, a annular stopper 33, with which the face of one side (left side of FIGS. 7(*a*) and 7(*b*)) along the central axis direction of the piston pin 2 in the fixed part 20*a* integrally formed each other, and an annular groove part 2*f*, into which the C-type clip 34 contacting with or being adjacent to the face of the other side (right side of FIGS. 7(*a*) and 7(*b*)) via a minute clearance is fit, are formed. In a state that the C-type clip 34 cannot be fit into the groove part 2*f*, the damper 20 is inserted from an opening of the through-hole 2*a* on the right side in FIGS. 7(*a*) and 7(*b*) and the face of one side on the fixed part 20*a* is contacted with the stopper 33. Next, the C-type clip 34 is inserted from the opening of the through-hole 2*a* using a jig and fitted into the groove part 2*f*. Thus, by the stopper 33 and the C-type clip 34, the fixed part 20*a* is fixed at the insertion part 2*e* of the piston pin 2 in the state of preventing coming-off.

In short, in the third embodiment shown in FIGS. 7(*a*) and 7(*b*), the restriction mechanism is configured by the stopper 33 provided on the inner circumferential part of the piston pin 2 at a correspondence position of the fixed part 20*a* and the C-type clip 34, and according to the structure, coming-off prevention of the damper 20 can be achieved by a simple configuration with the stopper 33 and the C-type clip 34.

In the third embodiment shown in FIGS. 7(*a*) and 7(*b*), since other structures, actions, and effects are almost same as the above embodiments, in FIGS. 7(*a*) and 7(*b*), the same numerical reference is given to the same part as a foregoing figure, and the detailed explanation is omitted.

Forth Embodiment

Figure 8:
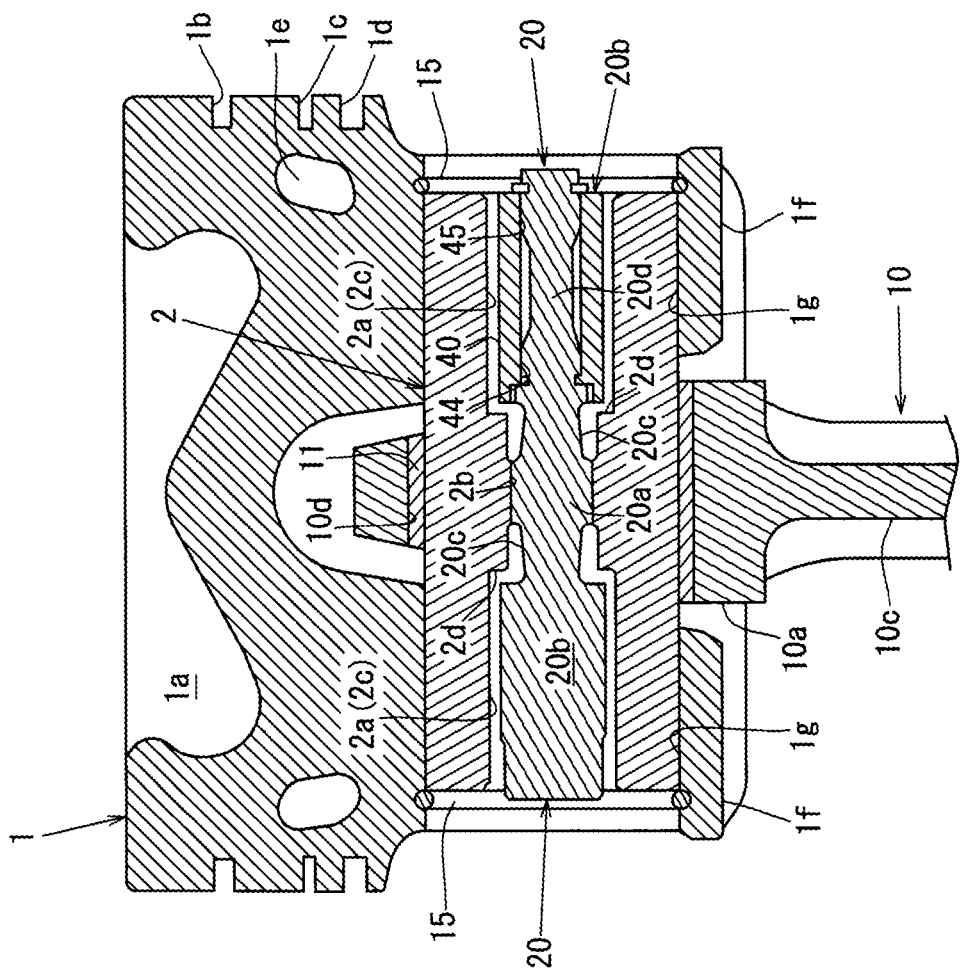
FIG. 8 is a sectional view illustrating another embodiment of the piston structure for an engine.
Figure 9:
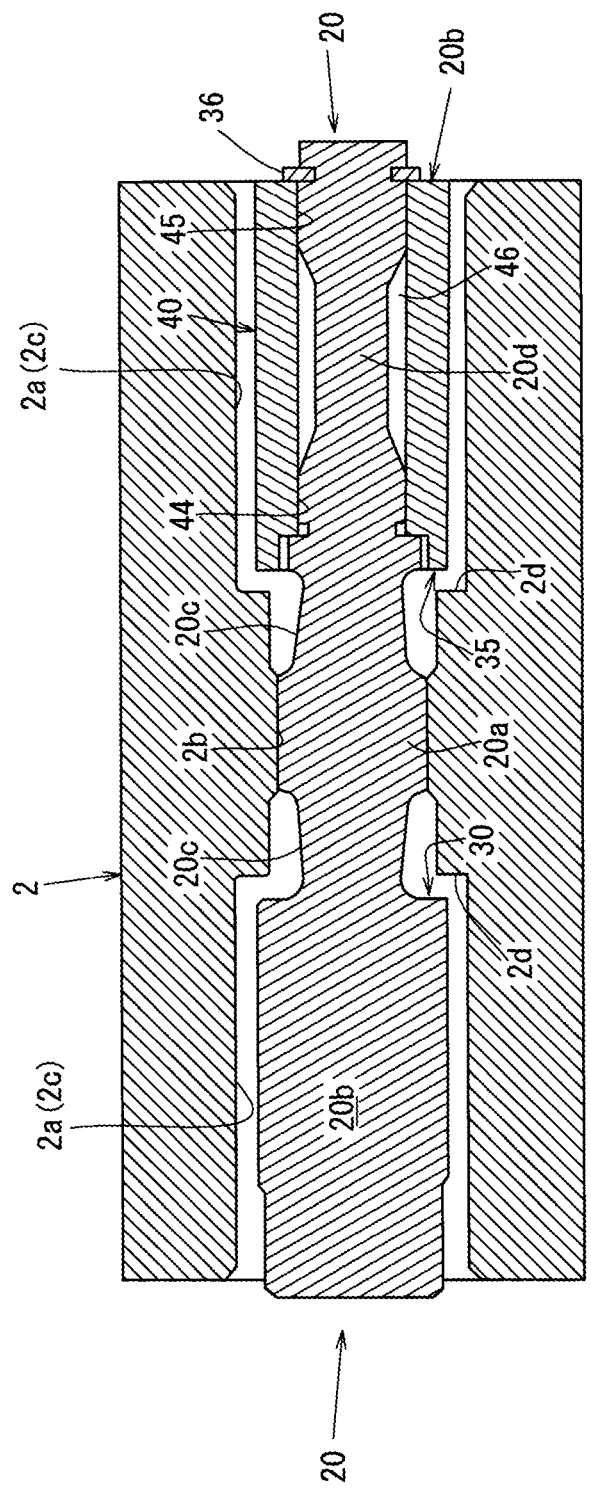
FIG. 9 is a partial enlarged sectional view of FIG. 8.

FIG. 8 is a sectional view illustrating further embodiment of a piston structure for an engine and FIG. 9 is a partial enlarged sectional view of FIG. 8. In the fourth embodiment shown in FIG. 8 and FIG. 9, two dampers 20 are provided, and on the supporting part 20*c* of the damper 20 of the right side as shown in Figure a shaft part 20*d* extending from the supporting part 20*c* in the axis direction of the piston pin is formed integrally with the supporting part 20*c*, and a cap part 40 is fixed on the outer circumference of the shaft part 20*d*. Thus, a movable part 20*b* is formed by the shaft part 20*d* and the cap part 40. Further, restriction mechanisms 30 and 35 are configured by the step face 2d of the small diameter part of the piston pin 2 for fixing the fixed part 20a and the large diameter part of the movable part 20b (the outer diameter part of the cap part 40 on the right side).

The cap part 40 is formed in a cylindrical shape which has a press-fit portions 44 and 45 at a tip side of the press-fit direction and a rear end side of the press-fit direction, the diameter of the shaft part 20d between these press-fit portions 44 and 45 is formed to be smaller relative to the inner diameter of the cap part 40 and a gap 46 is formed between the small diameter part and the inner circumferential face of the cap part 40 between the press-fit portions 44 and 45. Moreover, an outer end in the axial direction of the cap part 40 is fixed in a state of preventing coming-off by a locking ring 36 such as a C-type clip mounted to a corresponding part of the shaft part 20d.

Even if configured in this way, the diameter of the movable part 20b can be enlarged, as well as the coming-off prevention of the right and left side dampers 20 can be achieved by both (that is, the restriction mechanisms 30 and 35) of the step face 2d of the small diameter part of the piston pin 2 and the large diameter part (the outer diameter part of the cap part 40 on the right side) of the movable parts 20b. Moreover, the mass may be easily adjusted by the cap part 40.

In the third embodiment shown in FIG. 8 and FIG. 9, since other structures, actions, and effects are similar to the above embodiments, in FIG. 8 and FIG. 9, the same reference numbers are given to the same parts as in the foregoing Figures, and a detailed explanation is omitted for the sake of brevity.

Fifth Embodiment

Figure 10:
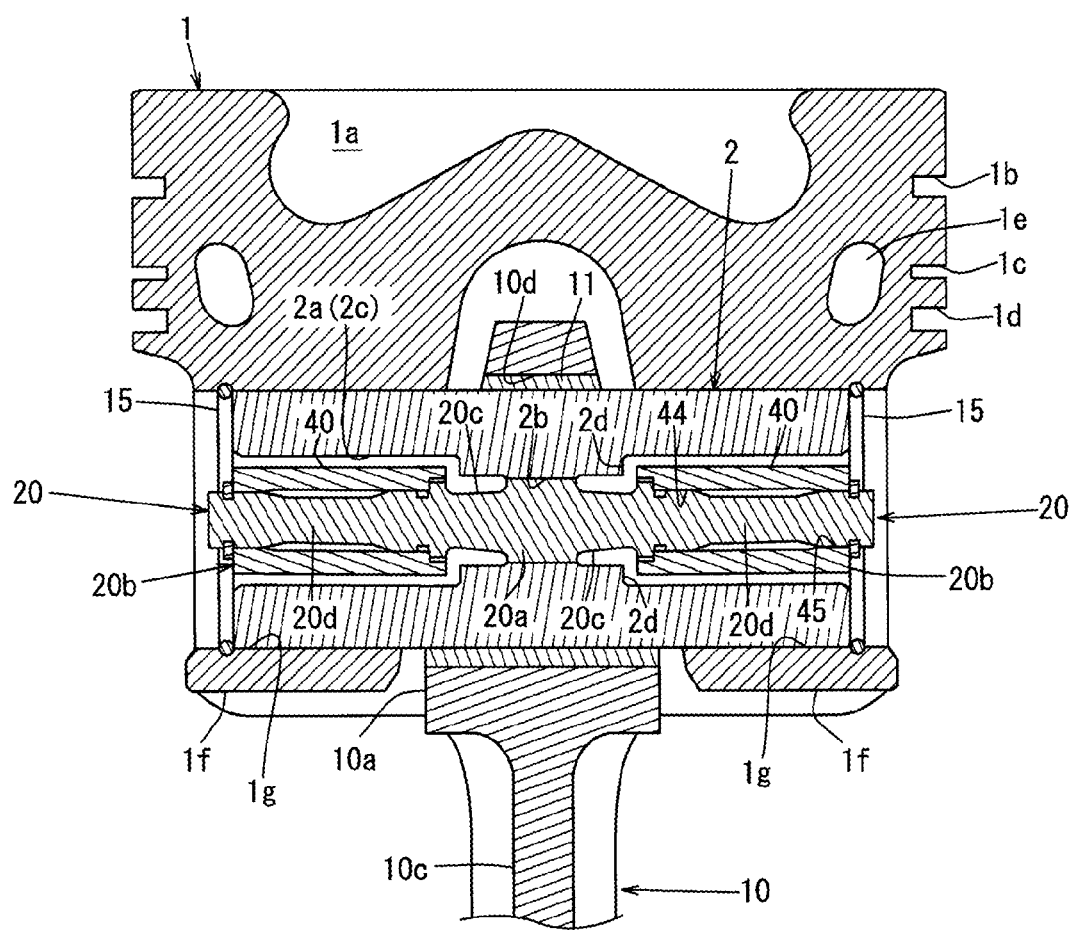
FIG. 10 is a sectional view illustrating another embodiment of the piston structure for an engine.
Figure 11:
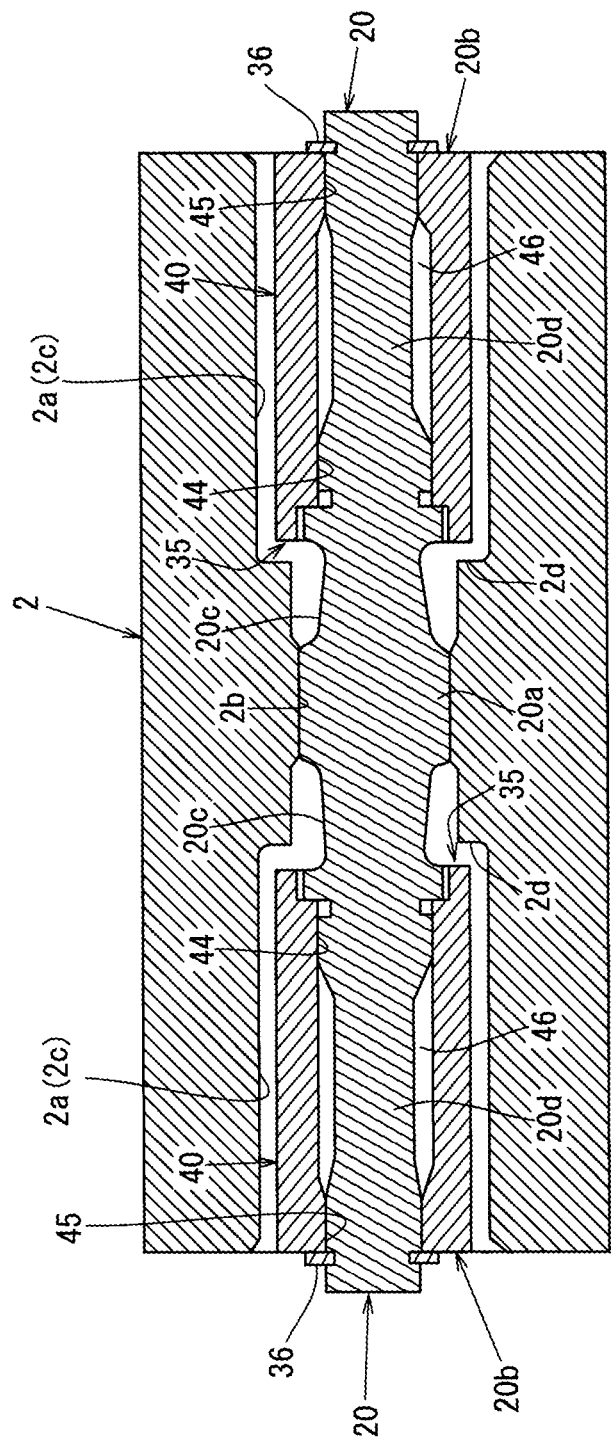
FIG. 11 is a partial enlarged sectional view of FIG. 10.

FIG. 10 is a sectional view illustrating a further embodiment of a piston structure for an engine and FIG. 11 is a partial enlarged sectional view of FIG. 10. In the fourth embodiment shown in FIG. 8 and FIG. 9, the right side as shown in the Figure separated by the fixed part 20a is the assembled damper 20 and the left side as shown in the Figure separated by the fixed part 20a is the integrated damper 20, however, in the fifth embodiment shown in FIG. 10 and FIG. 11, both sides as shown in the figure separated by the fixed part 20a are respectively equivalent assembled dampers 20 of the configuration as shown in the right side of FIG. 9.

In short, In the fifth embodiment shown in FIG. 10 and FIG. 11, two dampers 20 are provided, respective shaft parts 20d extending from the supporting part 20c in the axis directions of the piston pin 2 are provided on the supporting part 20c for each of the two dampers 20, respective cap parts 40 are fixed on the outer circumference of each shaft part 20d, respective movable parts 20b are formed by each corresponding shaft part 20d and cap part 40. Further, respective restriction mechanisms 35 are configured by the small diameter part (refer to the step face 2d) of the piston pin 2 for fixing the fixed part 20a and the large diameter part of each respective movable part 20b (refer to the outer diameter part of the cap part 40).

According to this configuration, while the two dampers 20 can be configured similarly or identically, the flexibility of frequency difference can be increased by adjusting the mass of each cap part 40.

In the fifth embodiment shown in FIG. 10 and FIG. 11, since other structures, actions, and effects are similar to the above embodiments, in FIG. 10 and FIG. 11, the same reference numbers are given to the same parts as in the foregoing Figures, and a detailed explanation thereof is omitted for the sake of brevity.

Sixth Embodiment

Figure 12:
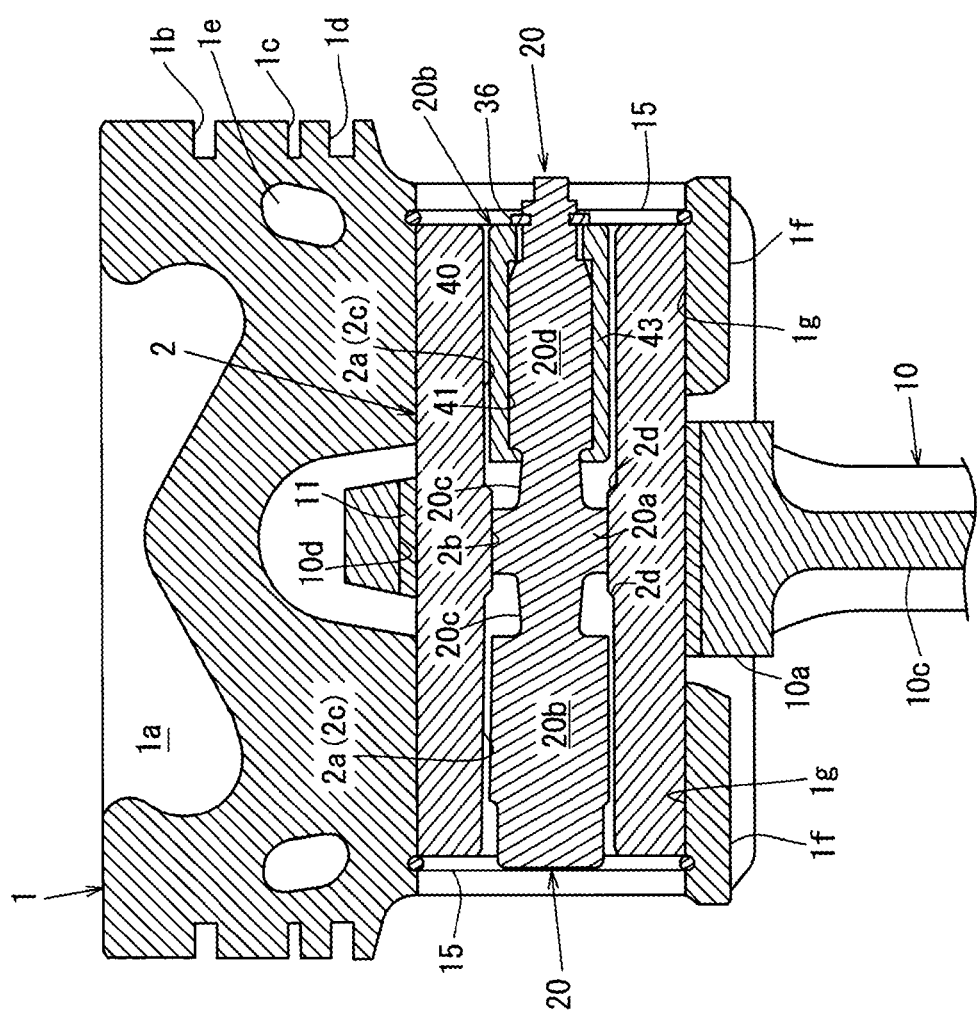
FIG. 12 is a sectional view illustrating another embodiment of the piston structure for an engine.
Figure 13:
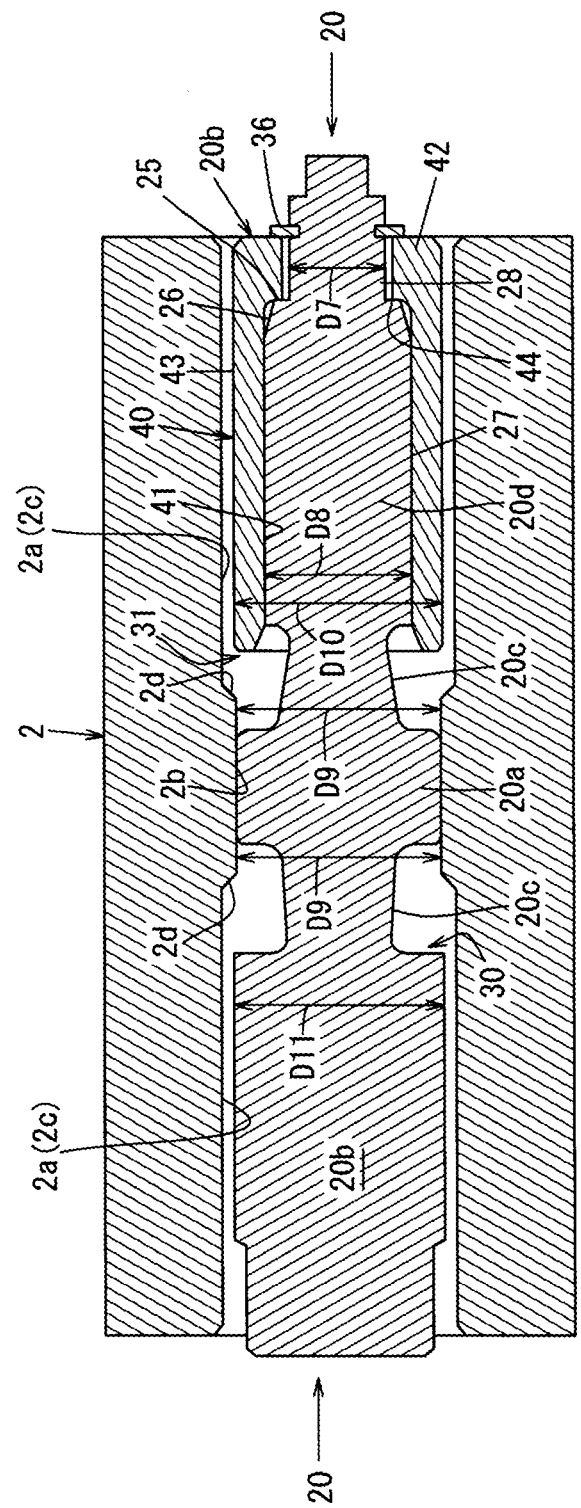
FIG. 13 is a partial enlarged sectional view of FIG. 12.

FIG. 12 is a sectional view illustrating a further embodiment of a piston structure for an engine and FIG. 13 is a partial enlarged sectional view of FIG. 12. In the integrated damper 20 of the left side as shown in FIG. 13, the outer diameter D11 of the supporting part 20c side of the movable part 20b is formed to be larger (D11>D9) relative to the inner diameter D9 of the minimum diameter part of the step face 2d of the piston pin 2, and herewith the regulation mechanism 30 is configured.

The assembled damper 20 of the right side as shown in FIG. 13 includes a shaft part 20d integrally formed with the supporting part 20c and extending from the supporting part 20c in the axis direction of the piston pin, and a cap part 40 fixed as a mass adjusting member on the outer circumference of this shaft part 20d. The shaft part 20d and cap part 40 form a movable part 20b. Moreover, the shaft part 20d includes a first shaft part 27 with an outer diameter of D8 formed integrally with a second shaft part 28 with an outer diameter of D7 in this order from the supporting part 20c toward the outer end side. A size of the outer diameters of each shaft part 27 and 28 are set so that a relational expression of D8<D7 is satisfied.

Further, while the step face 25 is formed on the end part of the supporting part 20c side of the second shaft part 28, a taper part 26 with an inner side that has a large diameter and an outer side that has a small diameter is formed between the outer end in the radial direction of the step face 25 and the first shaft part 27. The cap part 40 is formed integrally in a two-step cylindrical shape in which the press-fit portion 41 is over approximately an entire overall length in the axis direction of the first shaft part 27 and a neck part 42 is loosely fitted to the outer circumference of the second shaft part 28, and a stopper 44 is formed between a cylindrical part 43 having the same inner and outer diameters of the press-fit portion 41 and the neck part 42, and the press fitting is completed by contacting the stopper 44 with the step face 25 when the cap part 40 is press fitted.

Thus, the outer diameter D10 (the outer diameter of the movable part 20b) of the cap part 40 is formed to be larger (D10>D9) relative to the inner diameter D9 of the minimum diameter part of the step face 2d of the piston pin 2, and herewith the regulation mechanism 31 is configured.

Even if configured in this way, the restriction mechanism 30 and 31 restrict the damper 20 inside the piston pin 21 from coming off and ensure a coming-off function of the damper 20.

In the sixth embodiment shown in FIG. 12 and FIG. 13, since other structures, actions, and effects are similar to the above embodiments, in FIG. 12 and FIG. 13, the same reference numbers are given to the same parts as a foregoing Figures, and a detailed explanation thereof is omitted for the sake of brevity.

Seventh Embodiment

Figure 14:
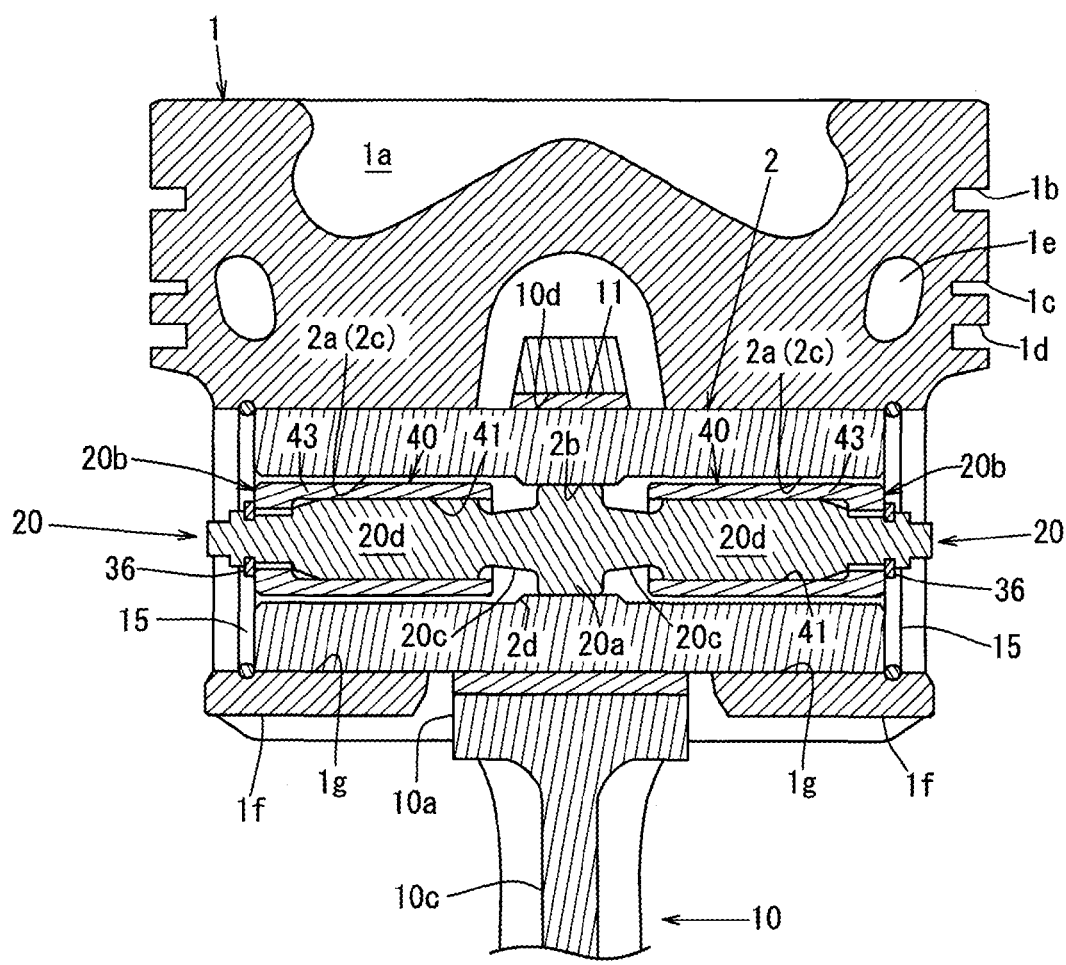
FIG. 14 is a sectional view illustrating another embodiment of the piston structure for an engine.
Figure 15:
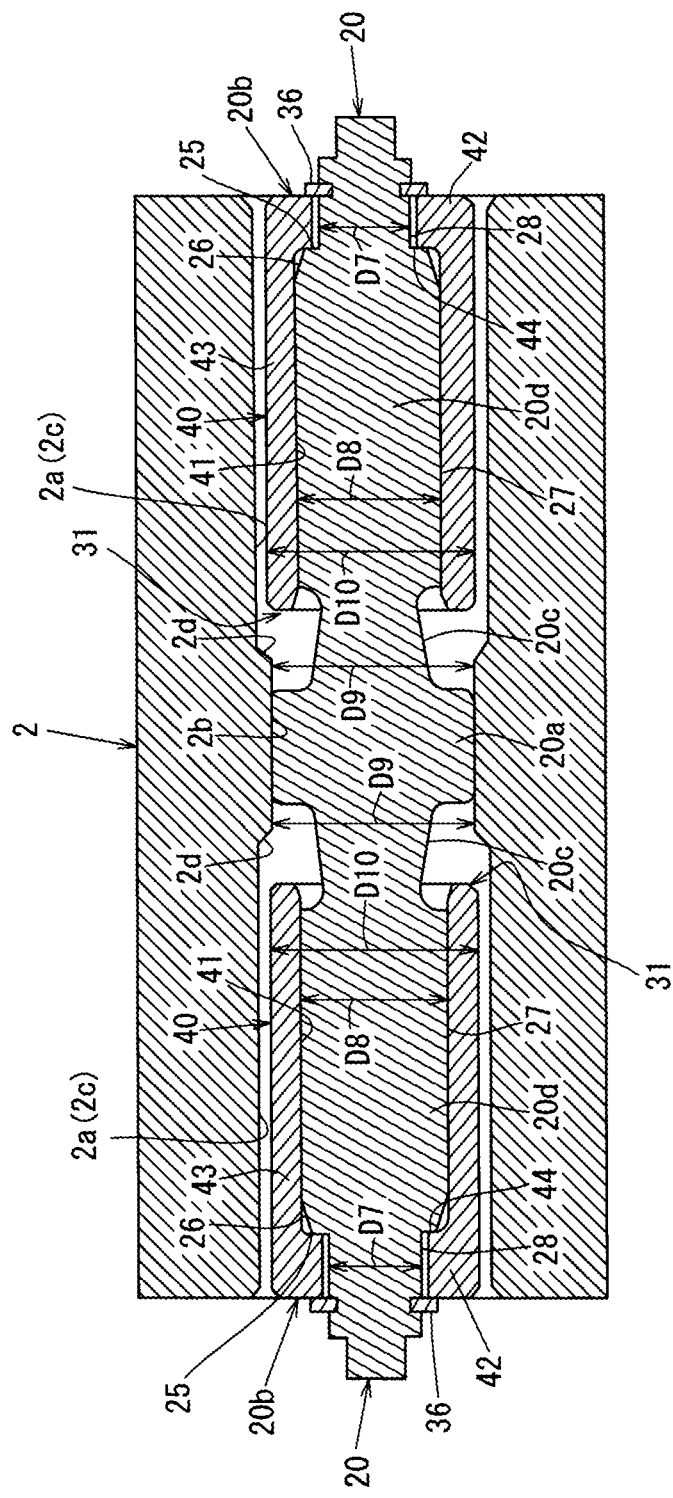
FIG. 15 is a partial enlarged sectional view of FIG. 14.

FIG. 14 is a sectional view illustrating another embodiment of a piston structure for an engine and FIG. 15 is a partial enlarged sectional view of FIG. 14. In the sixth embodiment shown in FIG. 12 and FIG. 13, the right side as shown in the Figure separated by the fixed part 20a is an assembled damper 20 and the left side as shown in the figure separated by the fixed part 20a is an integrated damper 20; however, in the seventh embodiment shown in FIG. 14 and FIG. 15, both sides as shown in the figure separated by the fixed part 20a are respectively equivalent assembled dampers 20 of the configuration as shown in the right side of FIG. 13. Even if configured in this way, the restriction mechanisms 31 restrict the damper 20 inside the piston pin 21 from coming off and ensure a coming-off function of the damper 20.

In the seventh embodiment shown in FIG. 14 and FIG. 15, since other structures, actions, and effects are similar to the above embodiments, in FIG. 14 and FIG. 15, the same reference numbers are given to the same parts as in the foregoing Figures, and a detailed explanation thereof is omitted for the sake of brevity.

In correspondence with the configuration of the present invention and the above embodiments, even though the dynamic absorber of the present invention corresponds to the damper 20, the present invention may not be limited only to the above embodiments. For example, in each above embodiment, although a full floating type was adopted as an assembly method of the piston pin 2, the present invention is not limited to this type of piston pin. It will be appreciated that a semi-floating type piston pin may be employed as piston pin 2, which is turnable with respect to the pin insertion hole 10d of the connecting rod 10 and fixed to the pin supporting hole 1g of the boss part 1f of the piston 1. Moreover, in the illustrated embodiments, although a piston 1 for diesel engines is illustrated, the present invention is also applicable to pistons for gasoline engines.

INDUSTRIAL APPLICABILITY

As explained above, the present invention is useful in a piston structure for an engine including a piston for reciprocating within a cylinder, a connecting rod having a smaller end part coupled to the piston and a larger end part coupled to a crankshaft, a cross-sectionally hollow piston pin coupling the piston to the smaller end part of the connecting rod, and a dynamic absorber provided inside the piston pin.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

EXPLANATION OF REFERENCE CHARACTERS

1 . . . Piston,
2 . . . Piston pin
10 . . . Connecting rod
10a . . . Smaller end part
10b . . . Larger end part
20 . . . Damper (Dynamic absorber)
20a . . . Fixed part
20b . . . Movable part
20c . . . Supporting part
20d . . . Shaft part
30, 31, 35 . . . Restriction mechanism
32, 34 . . . C-type clip
33 . . . Stopper
40 . . . Cap part

We claim:

1. A piston structure for an engine comprising:
   a piston reciprocating within a cylinder;
   a connecting rod having a smaller end part coupled to the piston and a larger end part coupled to a crankshaft;
   a cross-sectionally hollow piston pin coupling the piston to the smaller end part of the connecting rod; and
   a dynamic absorber provided inside the piston pin;
   wherein the dynamic absorber includes a fixed part fixed to the piston pin, a movable part extending in an axial direction formed along an axis of the piston pin, and a supporting part for swingably supporting the movable part with respect to the fixed part, as well as a restriction mechanism mechanically restricting the movement of the dynamic absorber in the axial direction.

2. The piston structure for an engine according to claim 1, wherein the restriction mechanism includes a C-type clip provided on the fixed part.

3. The piston structure for an engine according to claim 1, wherein the restriction mechanism includes a stopper provided on an inner circumferential part of the piston pin at a corresponding position of the fixed part, and a C-type clip.

4. The piston structure for an engine according to claim 1, wherein the dynamic absorber is a first dynamic absorber, the piston structure for an engine further comprising:
   a second dynamic absorber provided inside the piston pin, wherein the second dynamic absorber includes a portion of the fixed part fixed to the piston pin, a second movable part extending in an opposite axial direction formed along the axis of the piston pin opposite the axial direction, and a second supporting part for swingably supporting the second movable part with respect to the fixed part, as well as a second restriction mechanism mechanically restricting the movement of the second dynamic absorber in the opposite axial direction;
   wherein at least one of the first and second dynamic absorbers includes:
      a shaft part provided on the corresponding supporting part of the at least one of the first and second dynamic absorbers, and extending from the corresponding supporting part along the axis of the piston pin, and
      a cap part that is fixed on the outer circumference of the shaft part, wherein the second movable part is formed by the shaft part and the cap part, and further the second restriction mechanism includes a small diameter part of the piston pin for fixing the fixed part and a large diameter part of the second movable part.

5. The piston structure for an engine according to claim 1, wherein the dynamic absorber is a first dynamic absorber, the piston structure for an engine further comprising:
   a second dynamic absorber provided inside the piston pin, wherein the second dynamic absorber includes a portion of the fixed part fixed to the piston pin, a second movable part extending in an opposite axial direction formed along the axis of the piston pin opposite the axial direction, and a second supporting part for swingably supporting the second movable part with respect to the fixed part, as well as a second restriction mechanism mechanically restricting the movement of the second dynamic absorber in the opposite axial direction;
   wherein the movable part of each of the first and second dynamic absorbers respectively includes:
      a shaft part extending from the supporting part along the axis of the piston pin, and
      a cap part that is fixed on the outer circumference of the shaft part;
   wherein each of the first and second restriction mechanisms includes a respective small diameter part of the piston pin for fixing the fixed part and a respective large diameter part of the corresponding movable part.

* * * * *

UNITED STATES PATENT AND TRADEMARK OFFICE
CERTIFICATE OF CORRECTION

PATENT NO. : 9,347,396 B2
APPLICATION NO. : 14/473968
DATED : May 24, 2016
INVENTOR(S) : Koichi Hirata et al.

Page 1 of 1

It is certified that error appears in the above-identified patent and that said Letters Patent is hereby corrected as shown below:

On the title page item (30), line 3, Foreign Application Priority Data, delete "Feb. 20, 2014" and insert --Feb. 6, 2014--.

Signed and Sealed this
Twenty-sixth Day of July, 2016

Michelle K. Lee
*Director of the United States Patent and Trademark Office*